United States Patent [19]

Pasbrig

[11] Patent Number: 5,171,045
[45] Date of Patent: Dec. 15, 1992

[54] SEPARABLE DEVICE FOR CONNECTING TUBULAR ELEMENTS, HOSES, RODS OR THE LIKE

[75] Inventor: Max Pasbrig, Orselina, Switzerland

[73] Assignee: Lacrex S.A., Orselina/TI, Switzerland

[21] Appl. No.: 324,692

[22] Filed: Mar. 17, 1989

[30] Foreign Application Priority Data

Mar. 17, 1988 [DE] Fed. Rep. of Germany ....... 3809029
Dec. 30, 1988 [DE] Fed. Rep. of Germany ....... 3844421

[51] Int. Cl.$^5$ .......................................... F16L 37/092
[52] U.S. Cl. .................................... 285/308; 285/316; 285/317; 285/322; 285/331; 285/340; 285/906
[58] Field of Search ............... 285/322, 323, 308, 331, 285/340, 316, 317, 906

[56] References Cited

U.S. PATENT DOCUMENTS

| 4,005,883 | 2/1977 | Guest | 285/322 |
| 4,335,908 | 6/1982 | Burge | 285/323 |
| 4,630,848 | 12/1986 | Twist | 285/340 |
| 4,637,636 | 1/1987 | Guest | 285/323 X |

FOREIGN PATENT DOCUMENTS

| 379223 | 12/1985 | Austria . | |
| 0021795 | 1/1981 | European Pat. Off. . | |
| 31409 | 7/1981 | European Pat. Off. | 285/322 |
| 0146997 | 7/1985 | European Pat. Off. . | |
| 0212883 | 3/1987 | European Pat. Off. . | |
| 2328567 | 1/1975 | Fed. Rep. of Germany . | |
| 2534956 | 2/1976 | Fed. Rep. of Germany . | |
| 2631650 | 2/1977 | Fed. Rep. of Germany . | |
| 2805495 | 8/1978 | Fed. Rep. of Germany . | |
| 3025427 | 9/1981 | Fed. Rep. of Germany . | |
| 3508198 | 9/1986 | Fed. Rep. of Germany | 285/322 |
| 3513189 | 10/1986 | Fed. Rep. of Germany . | |
| 2051280 | 1/1981 | United Kingdom . | |
| 1602077 | 11/1981 | United Kingdom | 285/322 |

Primary Examiner—Dave W. Arola
Attorney, Agent, or Firm—Morgan & Finnegan

[57] ABSTRACT

A separable device for connecting tubular elements, hoses, rods or the like, comprising a tubular housing and a clamping member. In such a connecting device, a passage is formed in the tubular housing and comprises at least near one end a portion which is enlarged in diameter and which conically tapers toward the exit cross-section of the passage. The clamping member consists of a tubular member, which has an inside diameter that corresponds to the outside diameter of the tubular member, hose, rod or the like, and an outside diameter that corresponds to the diameter of the exit cross-section of the tubular housing. The tubular clamping member is adapted to be inserted into the tubular housing and into the enlarged portion to be retained therein by an enlarged end rim consisting of an annular bead, the outside diameter of which is smaller than the inside diameter of the enlarged portion but larger than the exit cross-section of the passage. The end portion of the clamping member which is provided with the enlarged rim is provided with a plurality of longitudinal slots, which extend through the shell and define resilient tongues in the tubular clamping member.

4 Claims, 4 Drawing Sheets

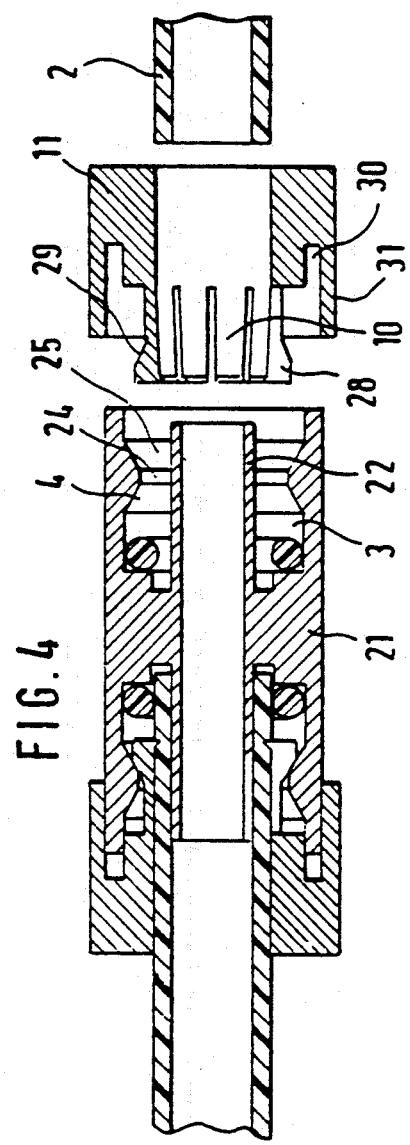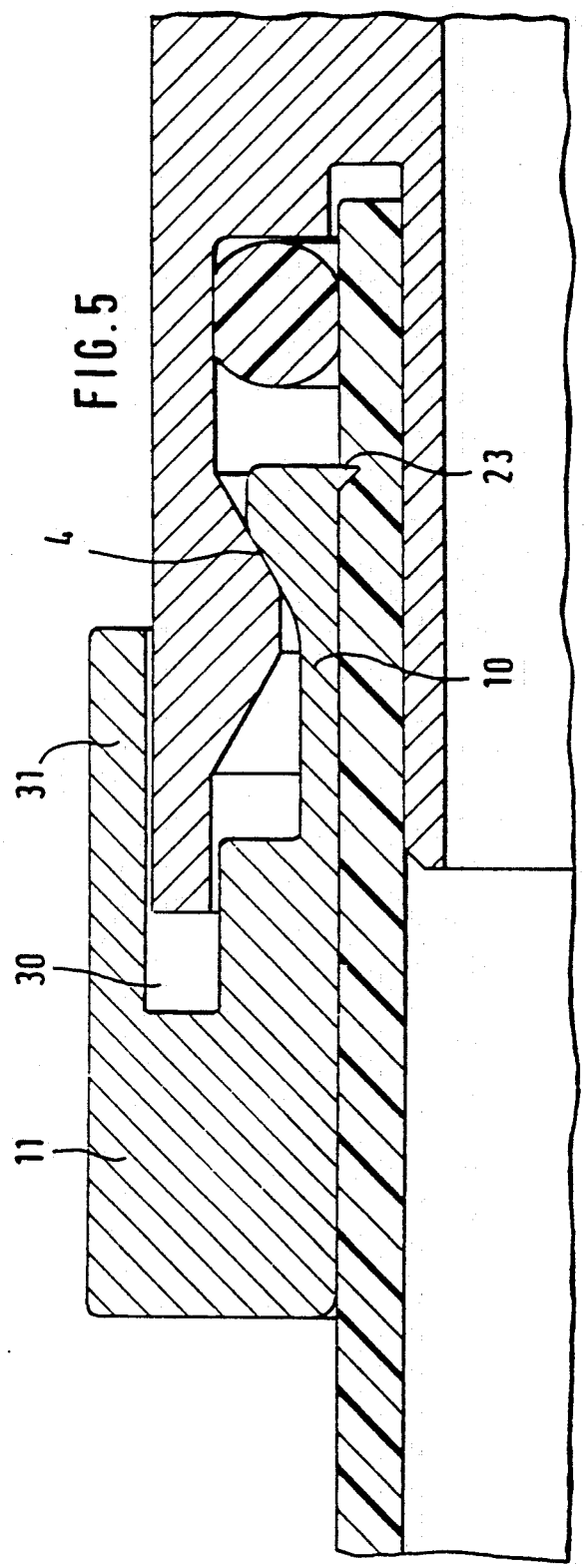

SEPARABLE DEVICE FOR CONNECTING TUBULAR ELEMENTS, HOSES, RODS OR THE LIKE

BACKGROUND OF THE INVENTION

1. Field of the Invention

This invention relates to a separable device for connecting tubular elements, hoses, rods or the like, comprising a tubular housing and a clamping member.

2. Description of the Prior Art

In hydraulic engineering, for example in robotics control, it is desired to couple hoses, tubular elements or the like to each other or to tubular ports quickly and also to separate them for an alternation. Quickly separable hose joints are required not only in hydraulic engineering but also in all fields in which liquids or gases are transported in a conducted through hoses or pipes.

In a connecting device which is of the kind described first hereinbefore and is known from German Patent Specification 23 28 567, radially resilient clamping fingers are provided with clamping cams, which conform to the peripheral groove of the element that is to be connected. By means of an axially displaceable locking sleeve that is subjected to spring pressure the clamping cams are forced into the peripheral groove and are held therein in a clamping position. By a return movement of the locking sleeve against the spring force the clamping fingers will be relieved from pressure so that tension exerted on the two parts of the connecting device will cause the clamping cams to be released from the peripheral groove and the two connected parts can then be separated. In that known connecting device the clamping mechanism will not ensure a firm joint unless the element to be connected has a peripheral groove conforming the clamping cams and unless a spring-biased locking sleeve is so arranged that it covers the clamping cams in their clamping position. Thin-walled tubular elements, hoses or the like cannot be provided with a peripheral groove and therefore an additional member with a peripheral groove is required for their connection.

SUMMARY OF THE INVENTION

For this reason it is an object of the invention to provide a separable connecting device which is of the kind first described herein below and which can be used to make a reliable and tightly sealed joint between tubular elements, hoses or the like of all kinds without a need for additional parts and deformations and which permits a quick separation.

In a connecting device of the kind concerned here that object is accomplished in accordance with the invention by forming a passage in the tubular housing, comprising at least near one end a portion which is enlarged in diameter and which conically tapers toward the exit cross-section of the passage, a clamping member consisting of a tubular member, which has an inside diameter that corresponds to the outside diameter of the tubular member, hose, rod or the like, and an outside diameter that corresponds to the diameter of the exit cross-section of the tubular housing. The tubular clamping member is adapted to be inserted into the tubular housing and into the enlarged portion and to be retained therein by an enlarged end rim consisting of an annular bead, the outside diameter of which is smaller than the inside diameter of the enlarged portion but larger than the exit cross-section of the passage. The end portion of the clamping member with the enlarged rim is provided with a plurality of longitudinal slots, which extend through the shell and define resilient tongues in the tubular clamping member. When it is desired to join a hose end to the hose coupling in accordance with the invention, the end of the hose will be pushed through the passage of the tubular clamping member into the enlarged portion of the tubular housing until the hose end entirely extends through the tubular clamping member. The inside diameter of the tubular clamping member is adapted to the diameter of the joining hose end such that at least the resilient tongues of the tubular clamping members would resiliently, i.e., non-positively, engage the outside surface of the hose. When a tension is then exerted on the hose, like pulling the hose out of the hose coupling, such tension would non-positively transmit to the tubular clamping member causing it to move outwardly. Such outward movement of the tubular clamping member will force inwardly those segments of the bead-shaped rim which slide on the conically tapered end portion of the enlarged portion. The resilient tongues press against the periphery of the hose more firmly. As a result, any tension exerted on the connected hose will further result in a stronger clamping action, and in a stronger hose joint. The bead-shaped rim at the end of the tubular clamping member is held with an axial play, i.e., with a limited axial displacement, in the enlarged portion so that the hose joint can be simply and quickly separated when the tubular clamping member is pushed into the tubular housing and the hose is pulled out of the hose coupling at the same time. As the tubular clamping member is pushed inwardly, the bead-shaped rim separates from the conical wedge surfaces such that the tongues bear only under their inherent resilient stress on the peripheral surface of the hose. The hose can then be pulled out of the hose coupling when merely small frictional forces have been overcome.

In accordance with a further feature of the invention the resilient tongues are provided with knife edge-like projections on their free ends and/or on their cylinder segment, like inside surfaces adjacent to the bead-shaped rim. When a tension is exerted on the hose, the projections will bite into the periphery of the hose increasing the clamping force will be increased. The knife edge-like projections may consist of peripherally extending riblike portions. They may alternatively consist of knife blades, which have been inserted into corresponding grooves on the inside of the resilient tongues.

The bead-shaped rim is suitably conically tapered toward its outer end. That conical taper will facilitate the insertion of the tubular clamping member into the tubular housing. It will be sufficient to force the tubular clamping member into the tubular housing until the segments of the annular bead-shaped rim snap into the enlarged housing portion and are locked therein.

In accordance with a preferred feature the tubular housing is provided with a central tubular extension, which extends through the enlarged portion and on which the hose to be connected is adapted to be slidably fitted. That design will be particularly desirable if the hose to be connected has a wall made of flexible material. Since the hose is slidably fitted on the mandrellike tubular portion disposed inside the tubular housing, the end portion of the hose will be supported and will be firmly gripped between the mandrellike tubular extension and the resilient tongues. As a result, the tubular extension will serve as an abutment for the resilient tongues which apply the clamping pressure.

The tubular clamping member is suitably provided with an annular enlarged actuating portion, which is spaced from the end face of the tubular housing. For a separation of the hose coupling the actuating portion can conveniently be pushed into the interior of the tubular housing such that the segments of the bead-shaped rim of the resilient tongues move away from the conical wedge surfaces.

The enlarged portion of the passage in the tubular housing is suitably inwardly adjoined via a step by a passage portion which has a diameter that corresponds to the diameter of the tubular member, hose, rod or the like. The hose is then pushed into that passage portion improving the retaining and guiding of the hose in the hose coupling.

In accordance with a further development an O ring is held in the enlarged portion of the passage in the tubular housing. That O ring will sealingly engage the outside peripheral surface of the tubular member, hose, rod or the like so as to improve the tightness of the joint.

In another embodiment the exit cross-section, which has a smaller diameter than the enlarger portion of the tubular housing, flares outwardly in a conical shape. Owing to that funnellike flare, the resilient tongues of the tubular clamping member can simply be forced into the tubular housing even if the segments of the bead-shaped rim formed by the resilient tongues are not conically beveled.

The two ends of the tubular housing may be provided with clamping members which are arranged like mirror images and held in enlarged annular chambers. Such a hose coupling will permit two hose ends to be connected.

In a further embodiment the tubular housing is provided at one end with a tubular extension, which is provided on the outer half of its periphery with profiled portions for retaining a slidably fitted hose.

BRIEF DESCRIPTION OF THE DRAWING

FIG. 4 is a longitudinal sectional view showing a third embodiment of a hose coupling for connecting two hose ends, FIG. 5 shows on a larger scale the top left-hand portion of the sectional view of FIG. 4.

DETAILED DESCRIPTION OF THE PREFERRED EMBODIMENTS

Figure 1:
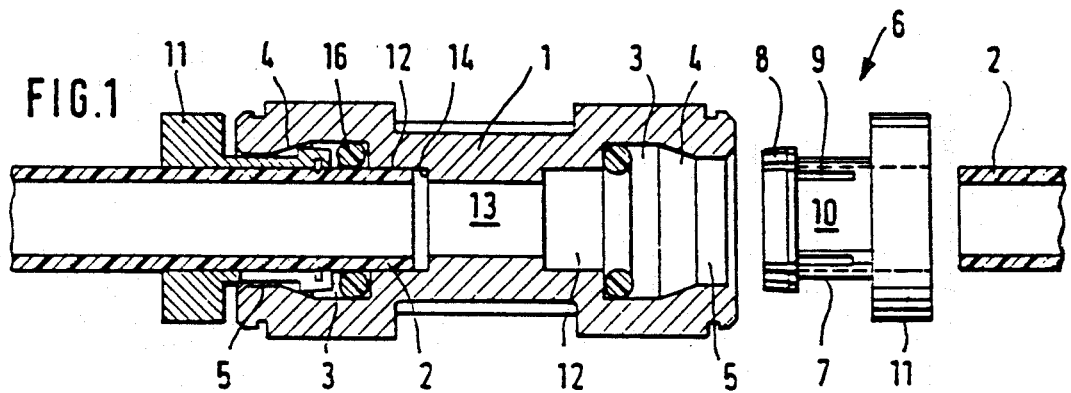
FIG. 1 is a longitudinal sectional view showing a first embodiment of a hose coupling for connecting two hose ends.

Illustrative embodiments of the invention will now be explained more in detail with reference to the drawing.

The hose coupling shown in FIG. 1 comprises a tubular housing 1, which is provided at both ends with coupling portions for a coupling of hose ends 2. Each coupling portion is constituted by a portion 3 of the tubular housing 1, which is enlarged in diameter. Each portion enlarged in diameter is adjoined toward the adjacent end of the tubular housing by a passage portion 4, which is conically tapered toward the adjacent end. The portion 4 is adjoined by an exit portion 5, which has a cylindrical bore. A tubular clamping member 6 has been inserted into each end coupling portion of the tubular housing 1. Each tubular clamping member 6 consists of a thin walled tubular portion 7, which at its end carries on its outside peripheral surface an annular bead-shaped enlarged rim 8. The tubular clamping member 6 is provided at its opposite end with an enlarged annular actuating member 11. The tubular clamping member 6 is provided with slots 9, which extend along generatrices and through the bead-shaped rim 8 and which define resilient tongues 10, as it is apparent from FIG. 1.

In FIG. 1 the tubular clamping member 6 has been inserted into the tubular housing to such an extent that the bead-shaped rim 8 is disposed in the boundary region between the enlarged cylindrical portion 3 and the adjoining conical portion 4.

The tubular clamping member 6 has a cylindrical passage, the diameter of which corresponds to the outside diameter of the hose 2.

Portion 3 which is enlarged in diameter is adjoined via an annular step by a cylindrical portion 12, the diameter of which corresponds also to the outside diameter of the hose 2. The tubular housing 6 is provided in its central portion with a passage portion 13, which has a diameter which generally corresponds to the inside diameter of the hose 2. An annular step 14 is formed between the portions 12 and 13 and may serve as a stop for the end of the hose which has been inserted.

As is apparent from FIG. 1, an O ring for sealing the tubular housing 1 against the hose 2 has been inserted into the annular chamber within the enlarged passage portion 3.

The diameter of the tubular portion 7 between the bead-shaped rim 8 and the annular actuating member 11 corresponds to the inside diameter of the passage portion 5 in the exit portion of the tubular housing 1. The length of the tubular portion 7 of the tubular clamping member 6 is such that the bead-shaped rim will be disposed adjacent to the enlarged cylindrical portion 3 of the passage and will entirely be outside the conical portion 4 when the actuating ring 11 has been pushed against the end face of the tubular housing 1.

The resilient tongues 10 defined by the slots 9 are provided on their cylindrical inside surfaces with peripheral grooves, in which knife edge-like blades 18 are held. Blades 18 support the resilient tongues 10 on the shell of the hose to be joined and slightly resiliently press against the hose.

The bead-shaped rim 8 at the end of the tubular clamping member 6 is conically beveled toward its free end so that the tubular clamping member with compressed resilient tongues can be pushed through the passage portion 5 into the tubular housing.

The tubular housing 1 and the tubular clamping member 6 consist of plastic injection moldings but may alternatively be made of metal.

In the illustrative embodiment shown in FIG. 3 the tubular housing is provided only at one end with a coupling member of the kind that has been described with reference to FIGS. 1 and 2. The opposite end of the tubular housing is provided with a tubular extension 20, the outside peripheral surface of which has a profiled portion for retaining a slidably fitted hose.

Figure 2:
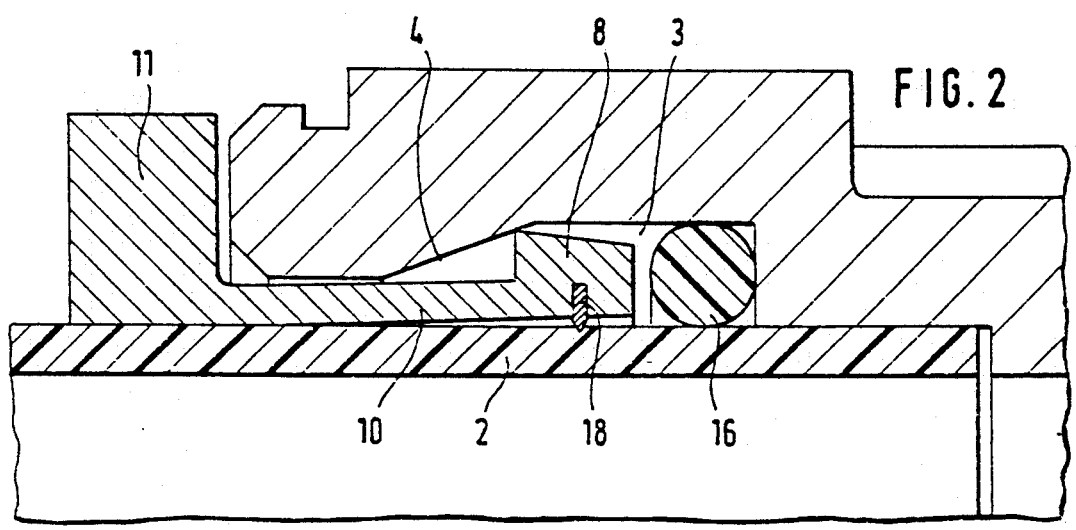
FIG. 2 shows on a larger scale the upper left-hand portion of the sectional view of FIG. 1.
Figure 3:
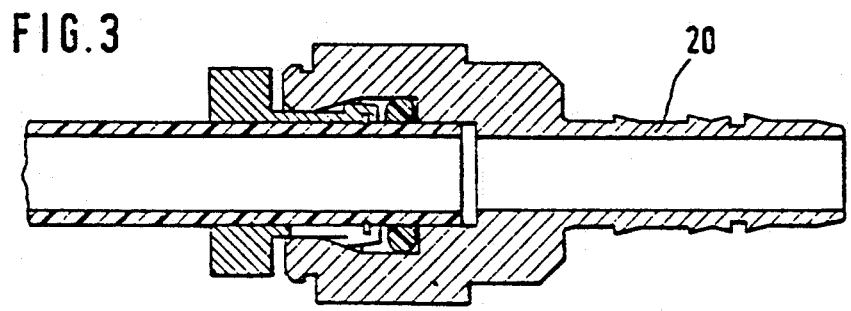
FIG. 3 is a longitudinal sectional view showing a second embodiment of a hose coupling.

In the embodiment shown in FIGS. 4 and 5, the coupling basically differs from the embodiment shown in FIGS. 1 and 2 only in that the tubular housing 21 is provided with tubular extensions 22, which extend through the chambers 3, which are larger in diameter, and the adjoining conical portions 4 and which terminate adjacent to the ends of the tubular housing 21. The outside diameter of said tubular extensions 22 corresponds to the inside diameter of the hose 2 that is to be connected. As a result, the central tubular extensions 22 serve as abutment surfaces, against which the hose portion to be clamped is forced by the resilient tongues 10 of the tubular clamping member.

In the illustrative embodiment shown in FIGS. 4 and 5 the resilient tongues 10 are integrally formed at their free end with inwardly protruding segments 23, which constitute annular knife edges.

The tubular housing 21 comprises a portion 24, which adjoins the conical portion 4 and has a cylindrical bore and is adjoined by a portion 25 which conically flares in an outward direction. As a result, the annular bead-shaped segments 28 at the ends of the resilient tongues 10 can easily be inserted into the tubular housing 21 even though they are not provided with conical chamfers. Instead, the annular bead-shaped segments 28 are provided on the rear with conical chamfers 29, which in an inserted position cooperate with the conical housing portion 4.

In the illustrative embodiment shown in FIGS. 4 and 5 the actuating member 11, on the side which faces the tubular housing 21 has an annular groove 30. The actuating member 11 has a cylindrical surface 31, which defines the annular groove 30 on the outside and which is extended to overlie the tubular housing 21 when the hose is coupled. The annular groove 30 may contain resilient elements, not shown, which tend to push out the cylindrical end portion of the tubular housing which has been inserted into the annular groove. As a result, the connecting device is held in its clamping position. This will particularly be necessary if the connecting device is used in vehicles, robots or machines which generate vibrations. Thus undesired spontaneous separation or loosening of the joint will then be prevented.

Figure 6:
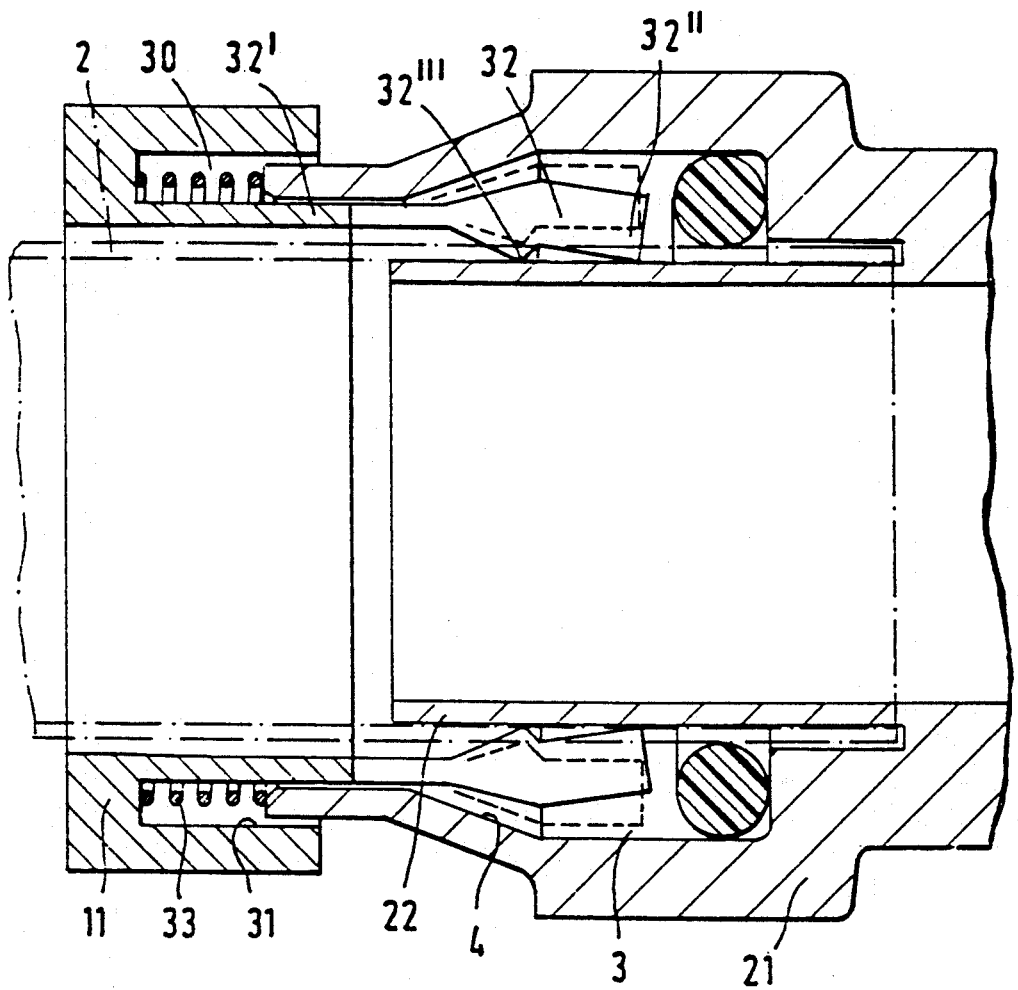
FIG. 6 is a fragmentary longitudinal sectional view showing a portion of a further illustrative embodiment of a hose coupling in accordance with the invention.

In the embodiment shown in FIG. 6, an actuating member 11 is formed with an annular groove 30, which contains resilient elements 33, which are so arranged that the actuating member 11 will be held in its clamping position. The actuating member 11 carries clamping elements 32, each consisting of a long thin portion 32′ and a short thicker portion 32″, which has protruding nose 32‴. Said noses 32‴ are so disposed in the conical portion 4 of the tubular housing 21 that the portion 32″ can cooperate with the conical portion 4. Because the clamping member is resilient, hoses, tubular members or the like can conveniently be inserted into the tubular housing 21 and clamped against the tubular extension 22. When pressure is applied to the actuating member 11 to push the latter into the tubular housing 21, the thicker portion 32″ will be pushed from the conical portion 4 into the enlarged chamber 3 and the noses 32‴ of the clamping member can then depart from the clamping position because the thinner portion 32′ is resilient.

Figure 7:
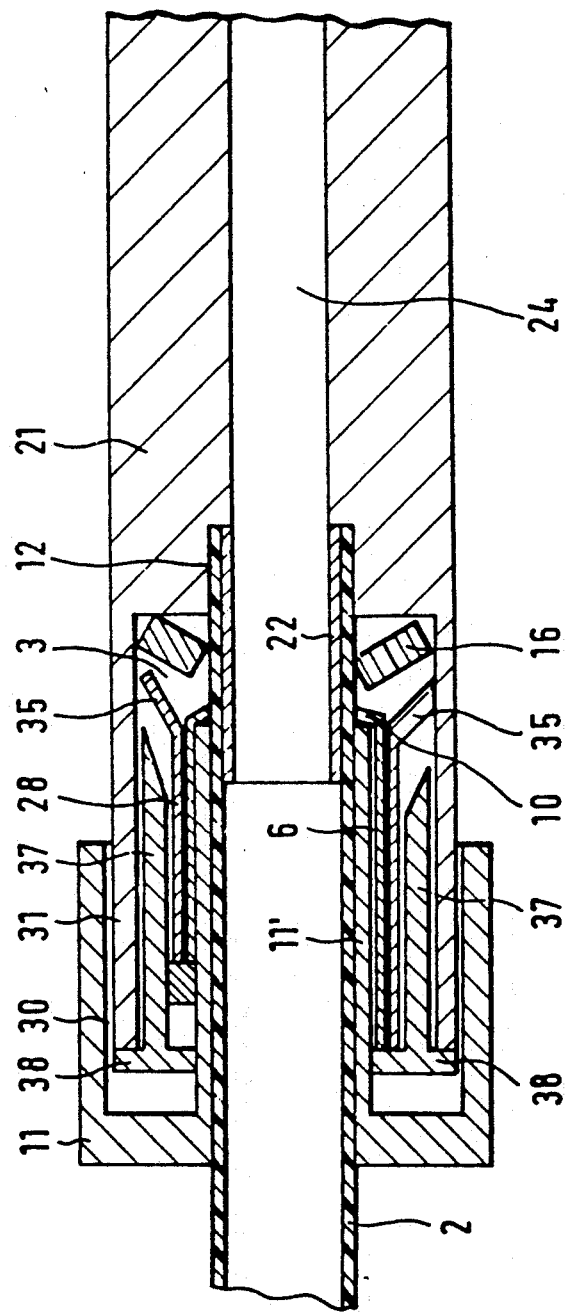
FIG. 7 is a fragmentary longitudinal sectional view showing a further embodiment of the device.

The embodiment shown in FIG. 7 comprises a tubular housing 21 having a cylindrical chamber 3. An annular insert 37 has a rim 38 and contains a slotted ring 28 having offset portions 35, which are directed toward the surface which defines chamber 3, a tubular clamping member 6 having resilient tongues 10 directed toward the tubular extension 22, and the slidably mounted sleeve 11′ of the actuating member. The sleeve 11′ is formed with a passage for the tubular member hose 2 or the like.

When the sleeve 11′ is forced against the tongues 10, the latter are moved out of the position in which they compress the hose 2. During that operation the offset portions 35 of the ring 28 resiliently yield and facilitate the separation of the tongues 10 from the clamping joint.

As is apparent from FIGS. 4, 5 and 6 and 7 the central tubular extension 22 cooperates with the hose 2, passage portion 12 and the sealing ring 16 to form a labyrinth gland system, which effects a relief of the pressure which is applied to the seals 16 in case of a retention of the fluid flowing through and causes the fluid to flow along a by-pass between the tubular extension 22 and the hose 2, which is a sliding fit on said extension, as far as the end of the passage extension and further between the surface 12 and the outside surface of the hose to the sealing ring 16.

The invention is not restricted to the illustrative embodiments shown. The connecting device in accordance with the invention may alternatively constitute a tubular port of apparatuses, brake drums of vehicles, pumps, liquid tanks as well as a connecting device on structural steel elements and on reinforcing steel rods for concrete. The connecting device will be designed in each case to conform to the part on which it is provided. Those parts which in the illustrative embodiments described hereinbefore consist of cylindrical tubular members may alternatively have other shapes, such as rectangular, square or oval shapes, in cross-section. Besides, the tubular extension 20 may not only be designed to receive a slidably fitted hose but may alternatively be joined thereto.

I claim:

1. A separable device for connecting tubular elements, comprising:
   a tubular housing forming a cylindrical chamber at one end and a passage at the opposite end, said passage extending into said cylindrical chamber,
   a tubular extension member, including a slidable sleeve which has a passage formed therein for reception of a tubular element, located in said tubular housing,
   an annular insert having a rim at the outer end of said insert, said annular insert being positioned within said cylindrical chamber with said rim positioned outside of said cylindrical chamber,
   a tubular clamping member having resilient tongues extending inwardly adjacent to said annular insert, said tongues compressing a tubular element disposed in said passage in said slidable sleeve and within said tubular housing,
   said annular insert being provided with a slotted ring having offset portions which are directed towards a surface defining said cylindrical chamber, said ring compressing against said resilient tongues, and said slidable sleeve located adjacent to said resilient tongues, whereby upon inward movement of said sleeve, said sleeve engages said tongues and moves said tongues outwardly thereby releasing pressure from said tongues on said tubular element located in said tubular housing.

2. A separable device for connecting a tubular element comprising a tubular housing and a clamping member, a passage formed in said tubular housing comprising at least near one end a portion which is enlarged in diameter and which conically tapers toward the exit cross-section of said passage, said tubular housing having a central tubular extension extending through the enlarged portion and on which a hose to be connected is adapted to be slidably fitted, the clamping member comprising a tubular member having an inside diameter that corresponds to the outside diameter of the tubular element and an outside diameter that corresponds to the diameter of the exit cross-section of said tubular housing, the tubular clamping member being provided with an enlarged annular actuating member which is spaced from the end face of said tubular housing and adapted to be inserted into the enlarged portion of said tubular housing and to be retained therein by an enlarged end rim having an annular bead, the outside diameter of which is smaller than the inside diameter of the enlarged portion of said tubular housing but larger than the exit cross-section of the passage of said tubular housing, that end portion of the clamping member which is provided with said enlarged rim being provided with a plurality of longitudinal slots which extend through said tubular clamping member and define resilient tongues n said tubular clamping member, and said actuating member being provided on one side with an annular groove which surrounds said resilient tongues and into which one end of said tubular housing is adapted to be slidably inserted, said annular groove containing inserted resilient elements resisting movement of said tubular housing inwardly within said annular groove.

3. A separable device for connecting a tubular element comprising a tubular housing and a clamping member, a passage formed in said tubular housing comprising at least near one end a portion which is enlarged in diameter and which conically tapers toward the exit cross-section of said passage, said tubular housing having a central tubular extension extending through the enlarged portion and on which a hose to be connected is adapted to be slidably fitted, the clamping member comprising a tubular member having an inside diameter that corresponds to the outside diameter of the tubular element and an outside diameter that corresponds to the diameter of the exit cross-section of said tubular housing, the tubular clamping member being provided with an enlarged annular actuating member which is spaced from the end face of said tubular housing and adapted to be inserted into the enlarged portion of said tubular housing and to be retained thereby an enlarged end rim having an annular bead, the outside diameter of which is smaller than the inside diameter of the enlarged portion of said tubular housing but larger than the exit cross-section of the passage of said tubular housing, that end portion of the clamping member which is provided with said enlarged rim being provided with a plurality of longitudinal slots which extend through said tubular clamping member and define resilient tongues in said tubular clamping member, and said actuating member having a cylindrical surface defining an annular groove on the outside which telescopically overlaps said tubular housing when said tubular housing is in its coupling position and which surrounds said resilient tongues and into which one end of said tubular housing is adapted to be slidably inserted, said annular groove containing inserted resilient elements resisting movement of said tubular housing inwardly within said annular groove.

4. A separable device for connecting a tubular element comprising a tubular housing and a clamping member, a passage formed in said tubular housing comprising at least near one end a portion which is enlarged in diameter and which conically tapers toward the exit cross-section of said passage, said tubular housing having a central tubular extension extending through the enlarged portion and on which said tubular element to be connected is adapted to be slidably fitted, said clamping member comprising a tubular member having an inside diameter that corresponds to the outside diameter of said tubular element and an outside diameter that corresponds to the diameter of the exit cross-section of said tubular housing, the tubular clamping member being adapted to be inserted into the enlarged portion of said tubular housing and to be retained therein by an enlarged end rim having an annular bead, the outside diameter of which is smaller than the inside diameter of the enlarged portion of said tubular housing but larger than the exit cross-section of the passage of said tubular housing which is conically tapered toward its outer end, and that end portion of said clamping member which is provided with said enlarged rim being provided with a plurality of longitudinal slots which extend through said tubular clamping member and define resilient tongues in said tubular clamping member, said resilient tongues being provided with grooves and knife edge-like projections selectively at the free ends thereof adjacent to said rim, and said knife edge-like projections consist of blades which are inserted in said grooves.

* * * * *